(12) United States Patent
Enomoto

(10) Patent No.: US 12,101,551 B2
(45) Date of Patent: Sep. 24, 2024

(54) IMAGE CAPTURING APPARATUS CAPABLE OF DETERMINING STATE OF USER, METHOD OF CONTROLLING IMAGE CAPTURING APPARATUS, AND STORAGE MEDIUM

(71) Applicant: CANON KABUSHIKI KAISHA, Tokyo (JP)

(72) Inventor: Daisuke Enomoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/061,105

(22) Filed: Dec. 2, 2022

(65) Prior Publication Data
US 2023/0179858 A1    Jun. 8, 2023

(30) Foreign Application Priority Data
Dec. 7, 2021    (JP) .................. 2021-198719

(51) Int. Cl.
*H04N 23/60*    (2023.01)
*H04N 23/611*   (2023.01)
*H04N 23/62*    (2023.01)
*H04N 23/65*    (2023.01)
*H04N 23/667*   (2023.01)
*H04N 23/90*    (2023.01)

(52) U.S. Cl.
CPC ........... *H04N 23/64* (2023.01); *H04N 23/611* (2023.01); *H04N 23/62* (2023.01); *H04N 23/651* (2023.01); *H04N 23/667* (2023.01); *H04N 23/90* (2023.01)

(58) Field of Classification Search
CPC ........ H04N 23/90; H04N 23/62; H04N 23/64; H04N 5/2254; H04N 13/218; H04N 13/344; H04N 13/282; H04M 2250/52; H04M 1/05
See application file for complete search history.

(56) References Cited

U.S. PATENT DOCUMENTS

| 2014/0160019 A1* | 6/2014 | Anda | ........ G06F 3/013 345/158 |
| 2019/0238826 A1* | 8/2019 | Sissom | ........ G02B 6/005 |

FOREIGN PATENT DOCUMENTS

| JP | 6180285 B2 | 8/2017 |
| JP | 2018-515966 A | 6/2018 |

* cited by examiner

*Primary Examiner* — Xi Wang
(74) *Attorney, Agent, or Firm* — Cowan, Liebowitz & Latman, P.C.

(57) ABSTRACT

An image capturing apparatus including a first image capturing section for capturing an image of an object, a second image capturing section for performing image capturing in a rear direction, and an operation section configured to receive an operation input by a user. In a case where no operation on the operation section is performed after an image of an object has been captured by the first image capturing section, whether or not a user has intention of capturing an image is determined based on an image captured by the second image capturing section. In a case where it is determined that the user does not have the intention of capturing an image, the first image capturing section is set o a first operation state rather than a second operation state larger in power consumption than the first operation state.

12 Claims, 5 Drawing Sheets

IMAGE CAPTURING APPARATUS CAPABLE OF DETERMINING STATE OF USER, METHOD OF CONTROLLING IMAGE CAPTURING APPARATUS, AND STORAGE MEDIUM

BACKGROUND OF THE INVENTION

Field of the Invention

The present invention relates to an image capturing apparatus that is capable of determining a state of a user, a method of controlling the image capturing apparatus, and a storage medium.

Description of the Related Art

Conventionally, there has been known an image capturing apparatus equipped with a plurality of image capturing sections. Published Japanese Translation of PCT international Publication (Tokuhyo) No. 2018-515966 discloses a power-saving complex camera device. The disclosed camera device is equipped with a stereo camera pair including a first camera and a second camera. In addition, the disclosed camera device includes a system controller that is capable of separately turning on/off the first camera and the second camera. Further, this camera device includes a processor configured to receive a first image via the first camera and detect a scene type of the first image. Further, this camera device executes parallax difference detection to determine whether or not the scene type is amenable to stereo-capture and detect whether or not the first image can be accurately resolved.

Further, this camera device is capable of stereo-capturing the first image and a second image via the stereo camera pair according to a determination result indicating that the first image can be accurately resolved. Then, for a scene where the stereo effect is difficult to achieve, the second camera is prevented from capturing an image, whereby power consumption of the digital camera is reduced.

Further, Japanese Patent No. 6180285 discloses an image capturing apparatus equipped with first image capturing means for capturing an image of an object to generate image data and second image capturing means for capturing an image of a user over a predetermined time period from before to after capturing the image of the object. This image capturing apparatus is configured to analyze a state of the user before and after capturing the image of the object in detail, based on the image captured by the second image capturing means.

However, the technique disclosed in Published Japanese Translation of PCT international Publication (Tokuhyo) No. 2018-515966 has nothing to do with the technique for capturing an image of a user himself/herself, and it is impossible to grasp a state of a user at the time of image capturing. Further, the technique disclosed in Japanese Patent No. 6180285 does not consider power consumption of the second image capturing means for capturing an image of a user at all.

SUMMARY OF THE INVENTION

The present invention provides an image capturing apparatus that makes it possible to reduce power consumption of the image capturing apparatus by determining a state of a user, a method of controlling the image capturing apparatus, and a storage medium.

In a first aspect of the present invention, there is provided an image capturing apparatus including a first image capturing section for capturing an image of an object, a second image capturing section for performing image capturing in a rear direction, and an operation section configured to receive an operation input by a user, at least one processor, and a memory coupled to the at least one processor, the memory having instructions that, when executed by the processor, perform the operations as: an image-capturing intention-determining section configured to determine, in a case where no operation on the operation section is performed after an image of an object has been captured by the first image capturing section, whether or not a user has intention of capturing an image, based on an image captured by the second image capturing section, and a controller that is configured to set, in a case where it is determined that the user does not have the intention of capturing an image, the first image capturing section to a first operation state selected from states in which image capturing can be performed, including the first operation state and a second operation state larger in power consumption than the first operation state.

In a second aspect of the present invention, there is provided a method of controlling an image capturing apparatus including a first image capturing section for capturing an image of an object, a second image capturing section for performing image capturing in a rear direction, and an operation section configured to receive an operation input by a user, including determining, in a case where no operation on the operation section is performed after an image of an object has been captured by the first image capturing section, whether or not a user has intention of capturing an image, based on an image captured by the second image capturing section; and setting, in a case where it is determined that the user does not have the intention of capturing an image, the first image capturing section to a first operation state selected from states in which image capturing can be performed, including the first operation state and a second operation state larger in power consumption than the first operation state.

According to the present invention, it is possible to reduce power consumption of the image capturing apparatus by determining a state of a user.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

The embodiments of the present invention will now be described in detail below with reference to the accompanying drawings. However, the components described in the following embodiments are described only by way of example, and are by no means intended to limit the scope of the present invention.

First, an image capturing apparatus according to a first embodiment will be described with reference to FIGS. 1A, 1B, 2, and 3.

Figure 1A:
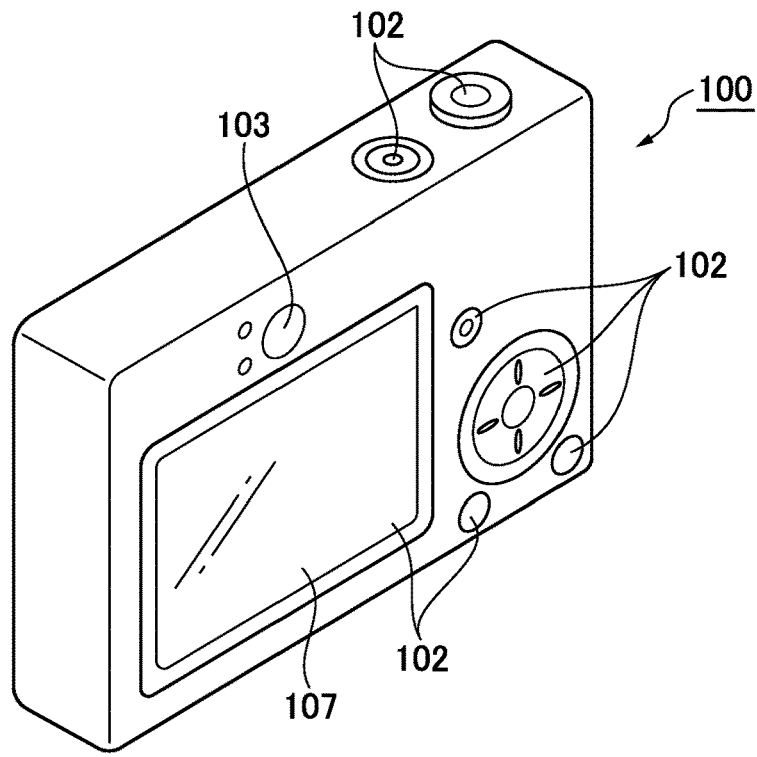
FIGS. 1A and 1B are schematic perspective views of the appearance of an image capturing apparatus according to embodiments of the present invention.
Figure 1B:
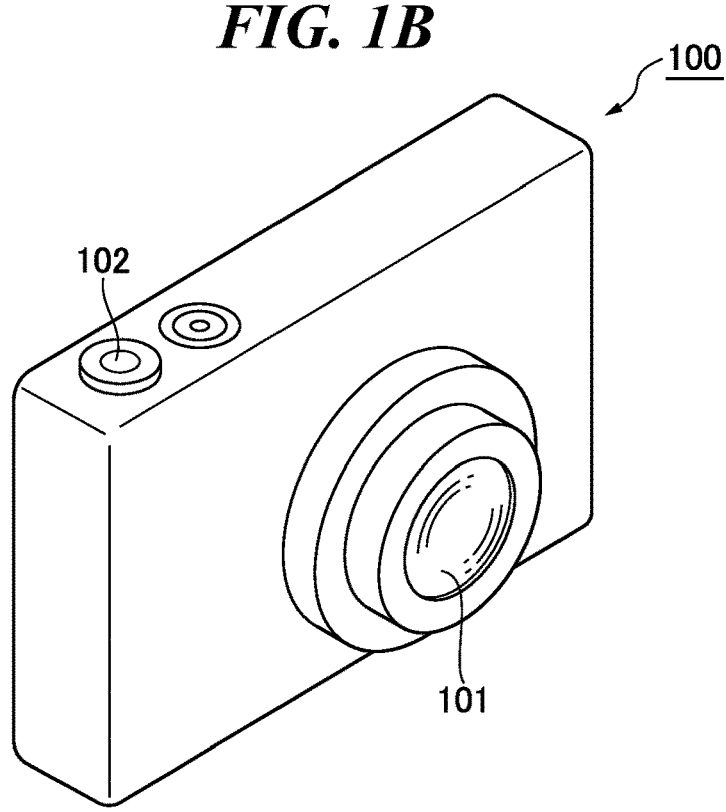

FIGS. 1A and 1B are schematic perspective views of the appearance of the image capturing apparatus, denoted by reference numeral 100, according to the first embodiment. FIG. 1A is a perspective view of the image capturing apparatus 100, as viewed from the rear, and FIG. 1B is a perspective view of the image capturing apparatus 100, as viewed from the front. As shown in FIGS. 1A and 1B, the image capturing apparatus 100 include a first image capturing section 101, an operation section 102, and a second image capturing section 103.

As shown in FIG. 1B, the first image capturing section 101 is provided on a front side of the image capturing apparatus 100. The first image capturing section 101 has an image capturing lens. An image of an object is formed on an image sensor, not shown, through the image capturing lens. As shown in FIG. 1A, the second image capturing section 103 is provided on a rear side of the image capturing apparatus 100. The second image capturing section 103 captures an image of e.g. a user himself/herself in a rear direction of the image capturing apparatus 100. Further, the rear surface of the image capturing apparatus 100 is provided with a display section 107. The display section 107 displays a variety of information, such as a captured image and a state of the image capturing apparatus 100. There are a case where the captured image includes user's own captured image information and a case where the captured image does not include the user's own captured image information.

The operation section 102 receives a variety of operations performed by a user. The operation section 102 is comprised of a shutter button operated by a user to instruct the first image capturing section 101 to capture an image of an object, and so forth. The operation section 102 includes a variety of operation elements, such as a variety of switches, buttons, and a touch panel.

Figure 2:
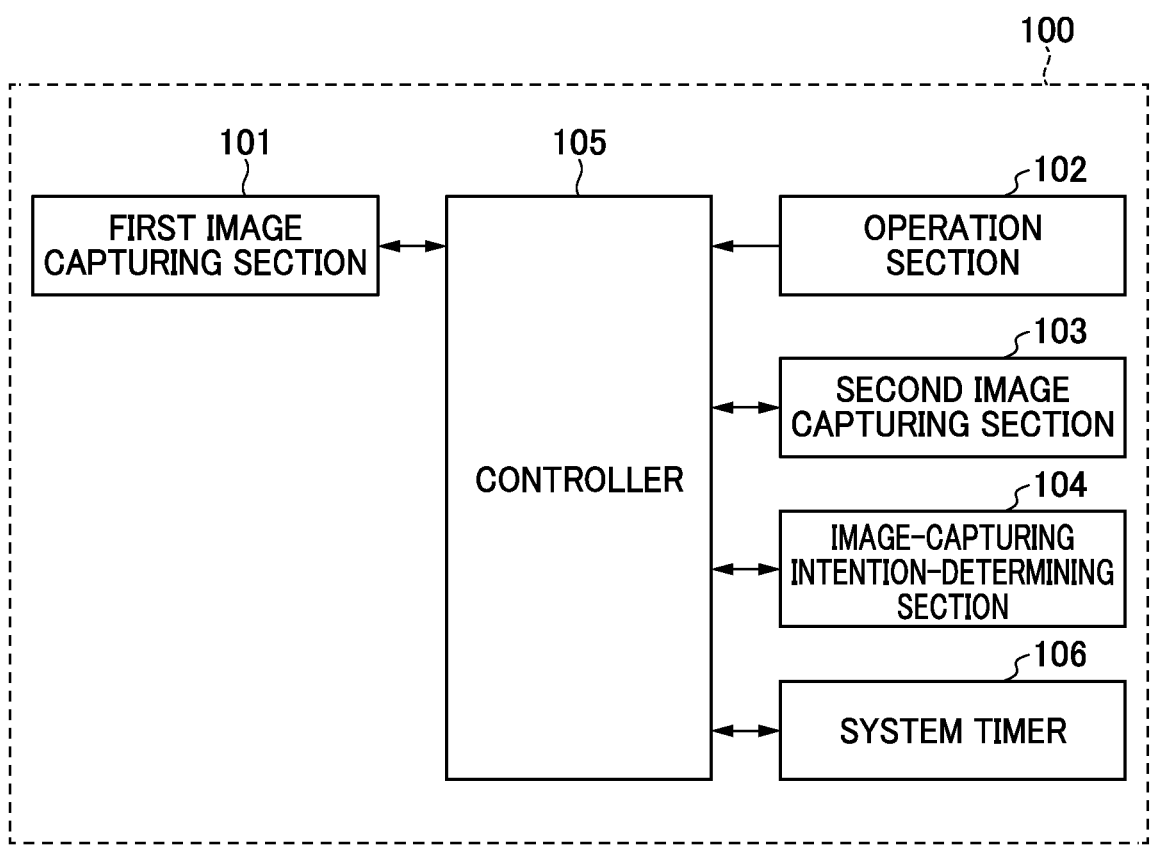
FIG. 2 is a functional block diagram of the image capturing apparatus.

FIG. 2 is a functional block diagram of the image capturing apparatus 100. The image capturing apparatus 100 includes not only the first image capturing section 101 for capturing an image of an object, the operation section 102, and the second image capturing section 103 for image capturing in the rear direction of the image capturing apparatus 100, which are described with reference to FIGS. 1A and 1B, but also an image-capturing intention-determining section 104, a system timer 106, and a controller 105 that controls these components.

The image-capturing intention-determining section 104 determines image-capturing intention of a user based on an image captured by the second image capturing section 103. In a case where a user's face is included in the image captured by the second image capturing section 103, the image-capturing intention-determining section 104 determines that the user has the intention of capturing an image. On the other hand, in case where a user's face is not included in an image captured by the second image capturing section 103, the image-capturing intention-determining section 104 determines that the user does not have the intention of capturing an image.

Further, the controller 105 controls the overall operation of the image capturing apparatus 100. The controller 105 has a variety of functions required for controlling the image capturing apparatus 100. In response to an instruction from the controller 105, the system timer 106 measures time elapsed from a starting point set to a predetermined timing. In a case where the a predetermined time period elapses from the starting point, the system timer 106 notifies the controller 105 of the lapse of the predetermined time period from the starting point.

The first image capturing section 101 and the second image capturing section 103 are controlled by the controller 105 to one of a normal image-capturing operation state, a power-saving image-capturing operation state, and an image-capturing operation stop state. Further, the first image capturing section 101 and the second image capturing section 103 are in a state with lower power consumption when in the power-saving image-capturing operation state (first operation state) than when in the normal image-capturing operation state (second operation state). The power-saving image-capturing operation state is a state in which an image can be captured with low power consumption. Further, the first image capturing section 101 and the second image capturing section 103 are in a state with lower-power consumption when in the image-capturing operation stop state than when in the power-saving image-capturing operation state. That is, power consumption is the lowest in the image-capturing operation stop state (third operation state), but the image-capturing operation stop state is a state in which supply of electric power to the image sensor is also suppressed and hence image capturing cannot be performed. The next lowest power consumption state is the power-saving image-capturing operation state, and the highest power consumption state is the normal image-capturing operation state.

Further, in an operation state in which a through image of an image is displayed by the image capturing apparatus 100 (object displaying state), at least one of the frequency of image capturing, the frequency of reading out an object image from the image sensor, and the pixel resolution of an image to be read out is made lower than in the normal image-capturing operation state, whereby the image capturing apparatus 100 is set to the power-saving image-capturing operation state. This makes it possible to make power consumption of the image sensor lower than in the normal image-capturing operation state and thereby achieve reduction of power consumption. Further, by shifting the image capturing apparatus 100 from the power-saving image-capturing operation state to the image-capturing operation stop state, it is possible to achieve further reduction of power consumption.

Next, a process for setting the first image capturing section 101 of the image capturing apparatus 100 according to the first embodiment to the power-saving image-capturing operation state will be described with reference to FIG. 3. Note that the present process is started from a state in which an image capturing instruction input by a user to the operation section 102 is received and capturing of an object is completed by the first image capturing section 101. At this time, the controller 105 performs control such that the first image capturing section 101 is set to the normal image-capturing operation state and the second image capturing section 103 is set to the image-capturing operation stop state.

First, in a step S301, the controller 105 determines whether or not any of a variety of image capturing preparation operations has been performed by a user on the operation section 102. If it is determined by the controller 105 that an image capturing preparation operation, such as an exposure adjustment operation using an exposure correction button, has been performed by the user on the operation section 102 (YES to the step S301), the process returns to the step S301. That is, in the step S301, the controller 105 repeats the determination of whether or not any of the variety of image capturing preparation operations has been performed by the user on the operation section 102. On the other hand, if it is determined by the controller 105 that none of the variety of image capturing preparation operations have been performed by the user on the operation section 102 (NO to the step S301), the process proceeds to a step S302.

Next, in the step S302, the controller 105 shifts the second image capturing section 103 to the normal image-capturing operation state. Next, in a step S303, the controller 105 controls the second image capturing section 103 to perform image capturing in the rear direction of the image capturing apparatus 100. Next, in a step S304, the controller 105 shifts the second image capturing section 103 to the image-capturing operation stop state.

Next, in a step S305, the image-capturing intention-determining section 104 determines whether or not the user has the intention of capturing an image. More specifically, the image-capturing intention-determining section 104 determines whether or not the user's face is included in the image captured by the second image capturing section 103 in the step S303. If the user's face is included in the image captured by the second image capturing section 103 (YES to the step S305), it is determined by the image-capturing intention-determining section 104 that the user has the intention of capturing an image, so that the process returns to the step S301. In the step S301, the controller 105 determines again whether or not any of the variety of image capturing preparation operations has been performed by the user on the operation section 102.

On the other hand, if the user's face is not included in the image captured by the second image capturing section 103 (NO to the step S305), it is determined by the image-capturing intention-determining section 104 that the user does not have the intention of capturing an image, so that the process proceeds to a step S306. In the step S306, the controller 105 shifts the first image capturing section 101 from the normal image-capturing operation state to the power-saving image-capturing operation state, followed by terminating the process in FIG. 3.

As described above, in the first embodiment, image capturing is executed by the second image capturing section 103 in a state in which none of the variety of image capturing preparation operations have been performed by the user on the operation section 102 immediately after execution of image capturing by the first image capturing section 101. Then, in a case where the user's face is not detected from the image captured by the second image capturing section 103, the controller 105 shifts the first image capturing section 101 to the power-saving image-capturing operation state. In other words, in a case where the user's face is detected from the image captured by the second image capturing section 103, the controller 105 sets the first image capturing section 101 to the normal image-capturing operation state and does not reduce the power consumption.

That is, in a case where the user does not have the intention of capturing an image after an image of an object is captured by the image capturing apparatus 100, the power consumption can be reduced by shifting the image capturing apparatus 100 to the power-saving image-capturing operation state. More specifically, in a case where the user does not perform any of image capturing preparation operations on the operation section 102 of the image capturing apparatus 100, the second image capturing section 103 is controlled not to continue the normal image-capturing operation state, whereby it is possible to prevent increase in power consumption of the image capturing apparatus 100.

Next, a second embodiment will be described. Note that the hardware configuration of the image capturing apparatus 100 according to the second embodiment is the same as that of the image capturing apparatus 100 described with reference to FIG. 2. In the second embodiment, in a case where a user is not operating the operation section 102, if the user exists within an angle of view of the second image capturing section 103, an image of the user's face is captured by the image-capturing operation (step S303 in FIG. 3) of the second image capturing section 103. As a result, the image-capturing operation of the second image capturing section 103 and the image-capturing intention determination processing of the image-capturing intention-determining section 104 are sometimes repeatedly performed in spite of the fact that the user does not have the intention of capturing an image.

In the second embodiment, a description will be given of control for achieving further reduction of power consumption of the image capturing apparatus 100, by preventing determination that the user has the intention of capturing an image due to capturing of an image of the user's face by the second image capturing section 103, in spite of the fact that the user does not have the intention of capturing an image, as described above.

Figure 4:
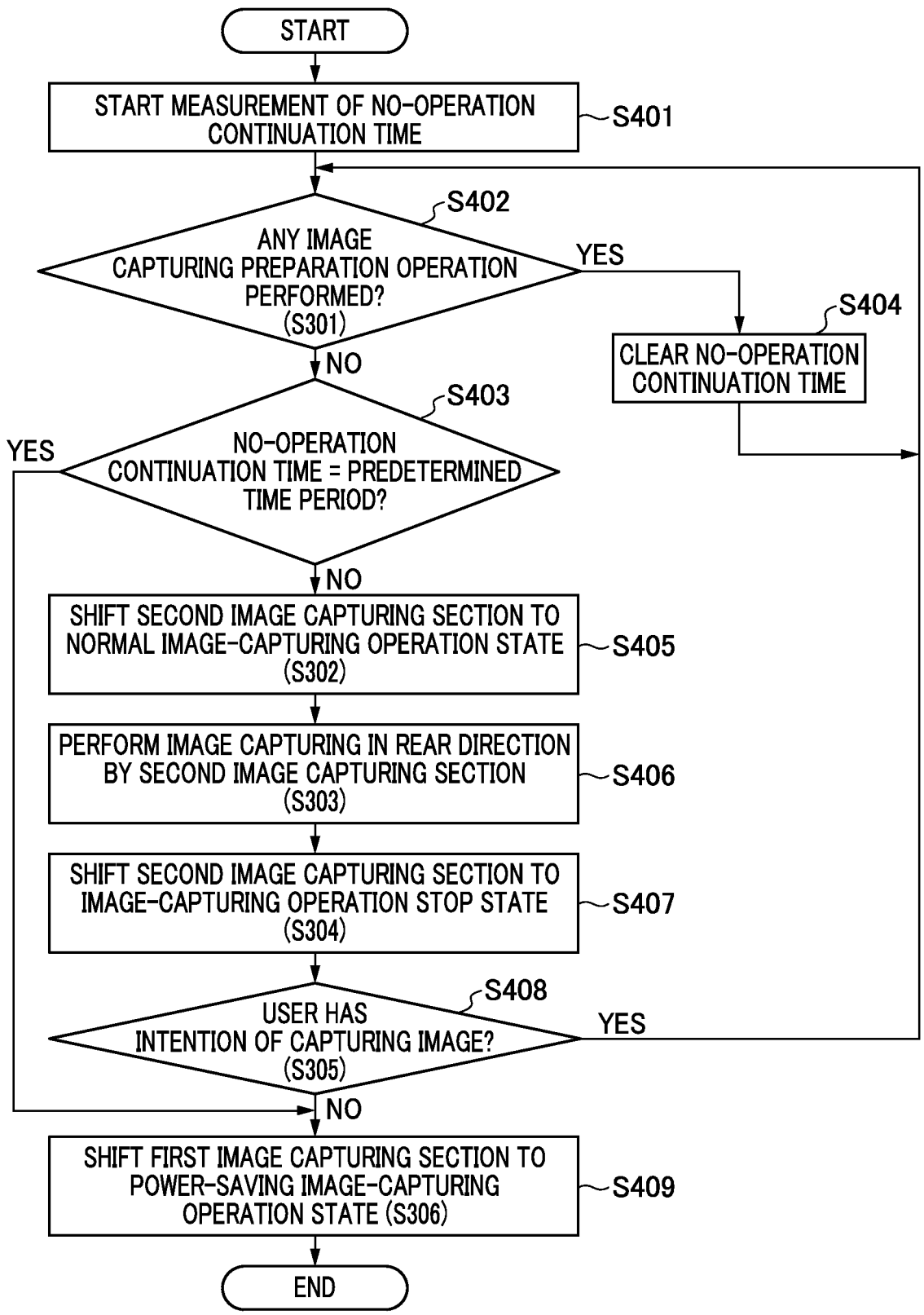
FIG. 4 is a flowchart of a process for setting a first image capturing section of an image capturing apparatus according to a second embodiment to a power-saving image-capturing operation state.

FIG. 4 is a flowchart of a process for setting the first image capturing section 101 of the image capturing apparatus 100 according to the second embodiment to the power-saving image-capturing operation state. Similar to the first embodiment, the present process is started from a state in which an image capturing instruction input by a user to the operation section 102 is received and capturing of an image of an object is completed by the first image capturing section 101. At this time, the controller 105 performs control such that the first image capturing section 101 is set to the normal image-capturing operation state and the second image capturing section 103 is set to the image-capturing operation stop state.

Figure 3:
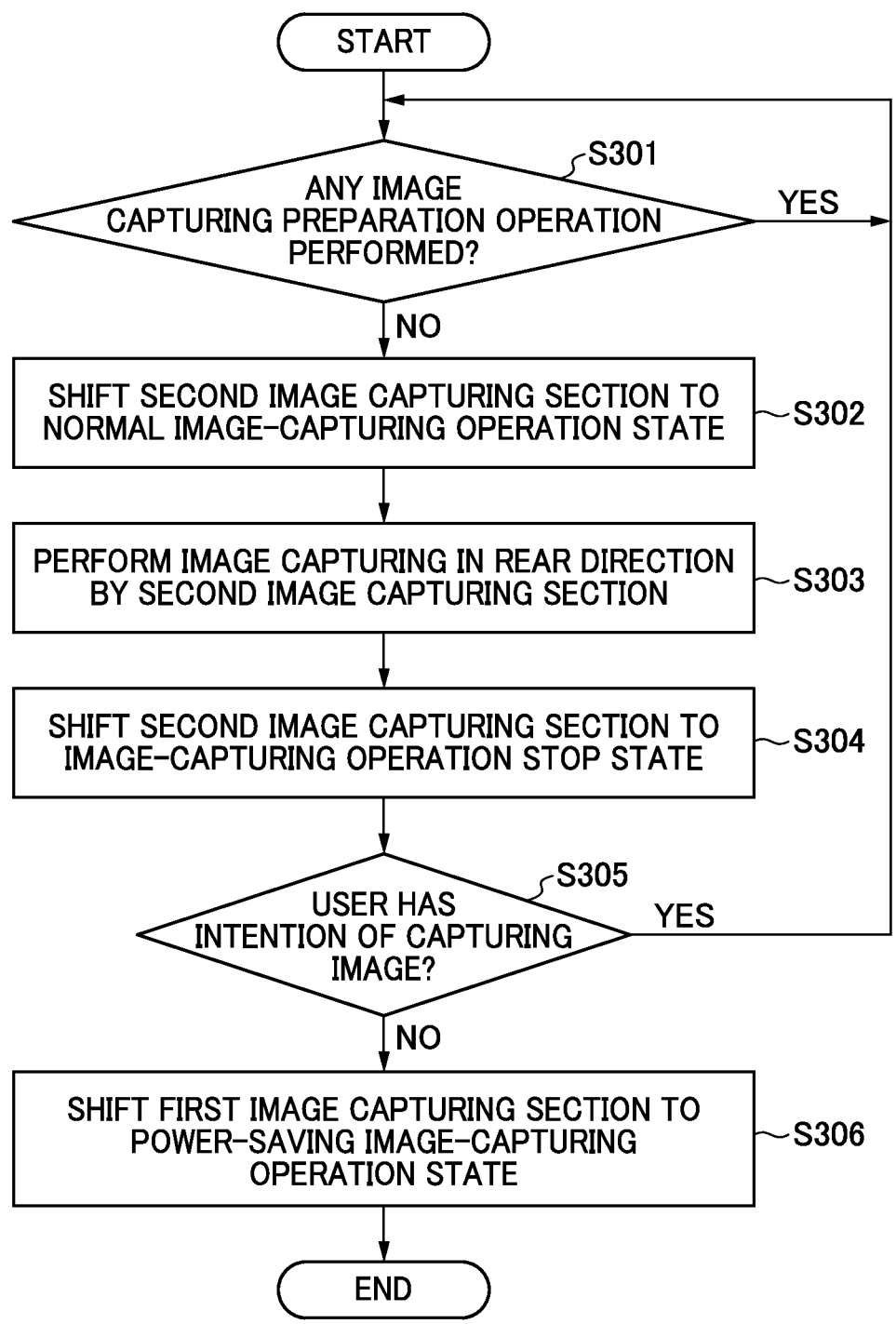
FIG. 3 is a flowchart of a process for setting a first image capturing section of the image capturing apparatus according to a first embodiment to a power-saving image-capturing operation state.

Note that in the flowchart in FIG. 4, the steps are described by adding the same step number as the corresponding step in FIG. 3 to a box (including a determination box) of each step for executing the same processing as in each corresponding step in FIG. 3. First, in a step S401, the controller 105 controls the system timer 106 to measures a no-operation continuation time from a starting point set to a time at which a user's operation on the operation section 102 is stopped. At the same time, the controller 105 controls the system timer 106 to notify, in a case where the no-operation continuation time measured by the system timer 106 has become equal to a predetermined time period, the controller 105 of this fact. With this, time measurement (counting) of the no-operation continuation time is started. Note that the predetermined time period of the no-operation continuation time is set to e.g. five seconds.

Next, in a step S402, the controller 105 determines whether or not any of the variety of image capturing preparation operations has been performed by the user on the operation section 102. If it is determined by the controller 105 that an image capturing preparation operation, such as the exposure adjustment operation using the exposure correction button, has been performed by the user on the operation section 102 (YES to the step S402), the process proceeds to a step S404. In the step S404, the controller 105 clears the no-operation continuation time measured by the system timer 106 and returns to the step S402. That is, in the step S402, the controller 105 repeats the determination of whether any of the variety of image capturing preparation operations has been performed by the user on the operation section 102. On the other hand, if it is determined by the controller 105 that none of the variety of image capturing preparation operations have been performed by the user on the operation section 102 (NO to the step S402), the process proceeds to a step S403.

Next, in the step S403, the controller 105 determines whether or not a notification has been received which indicates that the no-operation continuation time measured by the system timer 106 has become equal to the predetermined time period (e.g. five seconds). If it is determined by the controller 105 that the notification has not been received from the system timer 106 (NO to the step S403), the process proceeds to a step S405. On the other hand, if it is determined by the controller 105 that the notification has been received from the system timer 106 (YES to the step S403), the controller 105 proceeds to a step S409. In the step S409, the controller 105 shifts the first image capturing section 101 from the normal image-capturing operation state to the power-saving image-capturing operation state, followed by terminating the process in FIG. 4.

In the step S405, the controller 105 shifts the second image capturing section 103 to the normal image-capturing operation state. Next, in a step S406, the controller 105 controls the second image capturing section 103 to perform image capturing in the rear direction of the image capturing apparatus 100. Next, in a step S407, the controller 105 shifts the second image capturing section 103 to the image-capturing operation stop state.

Next, in a step S408, the image-capturing intention-determining section 104 determines whether or not the user has the intention of capturing an image. More specifically, the image-capturing intention-determining section 104 determines whether or not the user's face is included in the image captured by the second image capturing section 103 in the step S406. If the user's face is included in the image captured by the second image capturing section 103 (YES to the step S408), it is determined by the image-capturing intention-determining section 104 that the user has the intention of capturing an image, so that the process returns to the step S402. In the step S402, the controller 105 determines again whether or not any of the variety of image capturing preparation operations has been performed by the user on the operation section 102.

On the other hand, if the user's face is not included in the image captured by the second image capturing section 103 (NO to the step S408), it is determined by the image-capturing intention-determining section 104 that the user does not have the intention of capturing an image, so that the process proceeds to the step S409. In the step S409, the controller 105 shifts the first image capturing section 101 from the normal image-capturing operation state to the power-saving image-capturing operation state, followed by terminating the process in FIG. 4.

As described above, in the second embodiment, the no-operation continuation time indicating time during which no operation on the operation section 102 continues is measured by the system timer 106. Then, in a case where the no-operation continuation time has become equal to a predetermined time period, the controller 105 notified of this fact from the system timer 106 shifts the first image capturing section 101 to the power-saving image-capturing operation state.

Therefore, according to the second embodiment, in a case where an image of a user is captured by the second image capturing section 103 in a state in which no operation is performed on the operation section 102, the image-capturing operation performed by the second image capturing section 103 and the determination processing performed by the image-capturing intention-determining section 104 are prevented from being repeatedly performed for more than a predetermined time period. This predetermined time period is the predetermined time period of the no-operation continuation time.

A third embodiment will be described below with reference to FIG. 5. Note that the hardware configuration of the image capturing apparatus 100 according to the third embodiment is the same as that of the image capturing apparatus 100 shown in FIG. 2. Further, in a case where an image of the user is captured by the second image capturing section 103 in a state in which a user performs no operation on the operation section 102, the second embodiment has the following characterizing features: the image-capturing operation performed by the second image capturing section 103 and the determination processing performed by the image-capturing intention-determining section 104 are prevented from being repeatedly performed for more than the predetermined time period (the predetermined time period of the no-operation continuation time).

In the third embodiment, by limiting a time period during which the image-capturing operation performed by the second image capturing section 103 and the image-capturing intention determination processing performed by the image-capturing intention-determining section 104 are performed, further reduction of power consumption is achieved. The control operation of the image capturing apparatus 100 will be described below.

Figure 5:
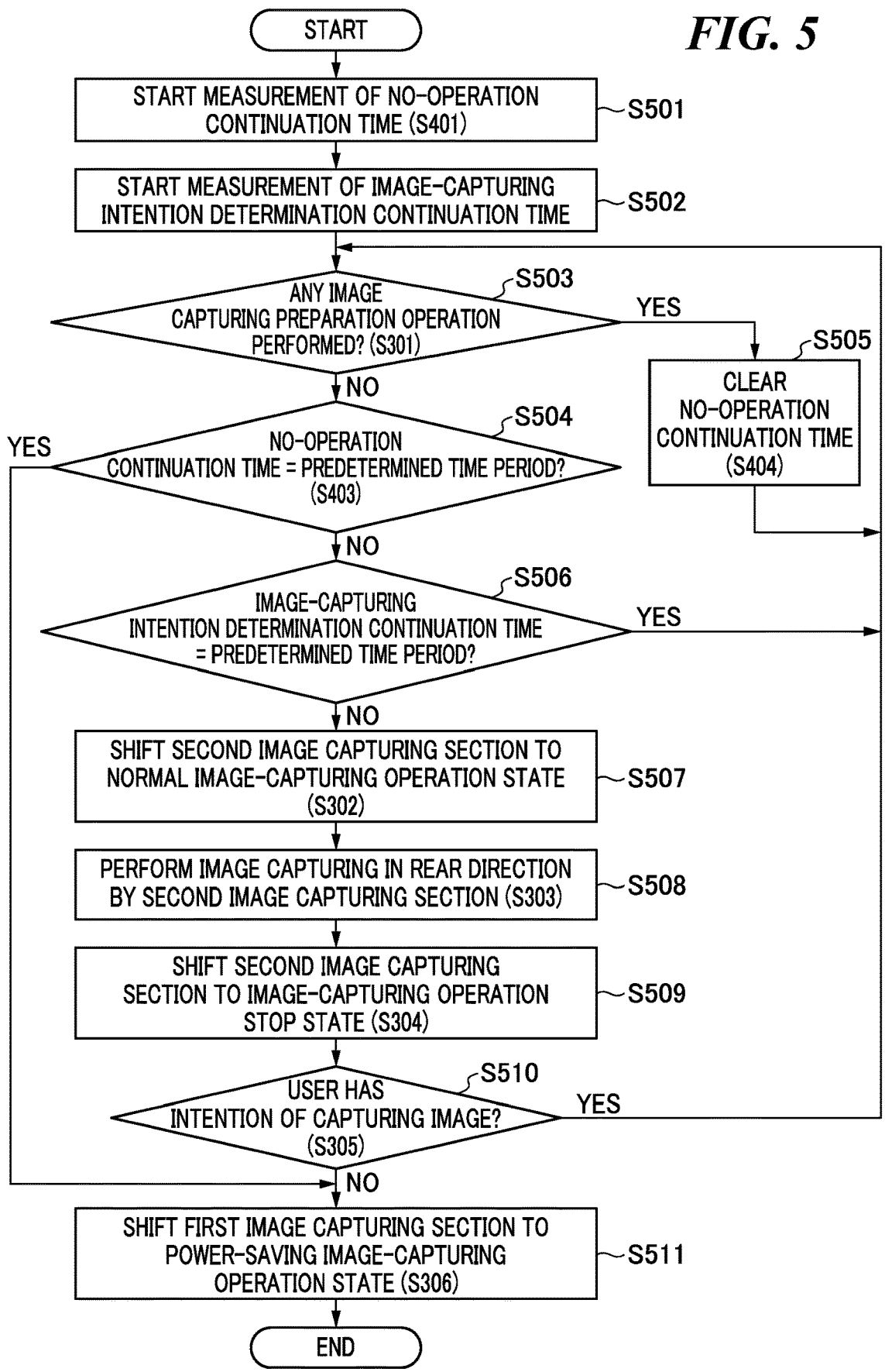
FIG. 5 is a flowchart of a process for setting a first image capturing section of an image capturing apparatus according to a third embodiment to a power-saving image-capturing operation state.

FIG. 5 is a flowchart of a process for setting the first image capturing section 101 of the image capturing apparatus 100 according to the third embodiment to the power-saving image-capturing operation state. Similar to the first embodiment and the second embodiment, the present process is started from a state in which an image capturing instruction input by a user to the operation section 102 is received and capturing of an image of an object is completed by the first image capturing section 101. At this time, the controller 105 performs control such that the first image capturing section 101 is set to the normal image-capturing operation state and the second image capturing section 103 is set to the image-capturing operation stop state.

Note that in the flowchart in FIG. 5, the steps are described by adding the same step number as the corresponding step in FIGS. 3 and 4 to a box (including a determination box) of each step for executing the same processing as in each corresponding step in FIGS. 3 and 4. Further, also in the third embodiment, the image-capturing intention-determining section 104 determines whether or not the user has the intention of capturing an image. Similar to the first embodiment, this determination is performed by determining whether or not the user's face is included in an image captured by the second image capturing section 103. If the user's face is detected, the image-capturing intention-determining section 104 determines that the user has the intention of capturing an image, whereas if the user's face is not detected, the image-capturing intention-determining section 104 determines that the user does not have the intention of capturing an image.

First, in a step S501, the controller 105 controls the system timer 106 to count the no-operation continuation time from a starting point set to a time at which a user's operation to the operation section 102 is stopped. At the same time, the controller 105 controls the system timer 106 to notify, in a case where the no-operation continuation time measured by the system timer 106 has become equal to a predetermined time period, the controller 105 of this fact. With this, time measurement (counting) of the no-operation continuation time is started. Note that the predetermined time period of the no-operation continuation time is set to e.g. five seconds.

Next, in a step S502, the controller 105 controls the system timer 106 to measure an image-capturing intention determination continuation time from a starting point set to a time at which the image-capturing operation performed by the second image capturing section 103 and the determination processing performed by the image-capturing intention-determining section 104 are started. At the same time, the controller 105 controls the system timer 106 to notify, in a case where the image-capturing intention determination continuation time measured by the system timer 106 has become equal to a predetermined time period, the controller 105 of this fact. With this, time measurement (counting) of the image-capturing intention determination continuation time is started. At this time, the predetermined time period of the image-capturing intention determination continuation time which is to elapse before the associated notification is performed is set to be a shorter time period (e.g. two seconds) than the predetermined time period of the no-operation continuation time which is to elapse before the associated notification is performed.

Next, in a step S503, the controller 105 determines whether or not any of the variety of image capturing preparation operations has been performed by a user on the operation section 102. If it is determined by the controller 105 that an image capturing preparation operation, such as the exposure adjustment operation using the exposure correction button, has been performed by the user on the operation section 102 (YES to the step S503), the process proceeds to a step S505. In the step S505, the controller 105 clears the no-operation continuation time measured by the system timer 106, and returns to the step S402. That is, in the step S503, the controller 105 repeats the determination of whether or not any of the variety of image capturing preparation operations has been performed by the user on the operation section 102. On the other hand, if it is determined by the controller 105 that none of the variety of image capturing preparation operations have been performed by the user on the operation section 102 (NO to the step S503), the process proceeds to a step S504.

Next, in the step S504, the controller 105 determines whether or not a notification has been received which indicates that the no-operation continuation time measured by the system timer 106 has become equal to the predetermined time period (e.g. five seconds). If it is determined by the controller 105 that the notification has not been received from the system timer 106 (NO to the step S504), the process proceeds to a step S506. On the other hand, if it is determined by the controller 105 that the notification has been received from the system timer 106 (YES to the step S504), the controller 105 proceeds to a step S511. In the step S511, the controller 105 shifts the first image capturing section 101 from the normal image-capturing operation state to the power-saving image-capturing operation state, followed by terminating the process in FIG. 5.

Next, in the step S506, the controller 105 determines whether or not a notification has been received which indicates that the image-capturing intention determination continuation time measured by the system timer 106 has become equal to the predetermined time period (e.g. two seconds). If it is determined by the controller 105 that the notification has been received from the system timer 106 (YES to the step S506), the process proceeds to the step S503. In the step S503, the controller 105 determines again whether or not any of the variety of image capturing preparation operations has been performed by the user on the operation section 102. From this time on, the image-capturing operation by the second image capturing section 103 and the determination processing by the image-capturing intention-determining section 104 are preventing from being performed. On the other hand, if it is determined by the controller 105 that the notification has not been received from the system timer 106 (NO to the step S506), the process proceeds to a step S507.

Next, in the step S507, the controller 105 shifts the second image capturing section 103 to the normal image-capturing operation state. Next, in a step S508, the controller 105 controls the second image capturing section 103 to perform image capturing in the rear direction of the image capturing apparatus 100. Next, in a step S509, the controller 105 shifts the second image capturing section 103 to the image-capturing operation stop state.

Next, in a step S510, the image-capturing intention-determining section 104 determines whether or not the user has the intention of capturing an image. More specifically, the image-capturing intention-determining section 104 determines whether or not the user's face is included in the image captured by the second image capturing section 103 in the step S508. If the user's face is included in the image captured by the second image capturing section 103 (YES to the step S510), it is determined by the image-capturing intention-determining section 104 that the user has the intention of capturing an image, so that the process returns to the step S503. In the step S503, the controller 105 determines again whether or not any of the variety of image capturing preparation operations has been performed by the user on the operation section 102.

On the other hand, if the user's face is not included in the image captured by the second image capturing section 103 (NO to the step S510), it is determined by the image-capturing intention-determining section 104 that the user does not have the intention of capturing an image, so that the process proceeds to the step S511. In the step S511, the controller 105 shifts the first image capturing section 101 from the normal image-capturing operation state to the power-saving image-capturing operation state, followed by terminating the process in FIG. 5.

As described above, according to the third embodiment, not only the no-operation continuation time is measured, but also the image-capturing intention determination continuation time configured to be shorter than the no-operation continuation time is measured, and execution of the image-capturing intention determination processing is limited to the predetermined time periods immediately after execution of image capturing by the first image capturing section 101. With this control, in such a case where the image-capturing operation and interruption of the image-capturing operation are repeatedly performed, compared with the control performed while measuring only the no-operation continuation time, it is possible to more quickly shift the image capturing apparatus 100 to the low-power consumption state. For example, even when the image capturing apparatus 100 is shifted from an image capturing state in which the user captures an image of an object by holding the image capturing apparatus ready for photographing, to a carrying state in which the user carries the image capturing apparatus without performing image capturing, it is possible to quickly shift the image capturing apparatus 100 to the low-power consumption state, compared with the control performed while measuring only the no-operation continuation time.

In the first to third embodiments described above, the description is given of the example of the operation control in which the image-capturing intention determination processing is performed by the image-capturing intention-determining section 104 to reduce power consumption of the image capturing apparatus 100. However, there is envisaged that, in addition to the use for the image-capturing intention determination processing, the second image capturing section 103 is used for capturing an image of a user before and/or after an image-capturing operation by the first image capturing section 101. In such a case, an operation section (not shown) may be provided for setting whether or not it is required to perform the image-capturing intention determination processing by the image-capturing intention-determining section 104. The controller 105 can be configured to perform the control in the first to third embodiments according to an operation performed on this operation section, not shown.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-198719 filed Dec. 7, 2021, which is hereby incorporated by reference herein in its entirety.

What is claimed is:

1. An image capturing apparatus comprising:
a first image capturing section configured to include a first image sensor and to capture an image of an object;
a second image capturing section configured to include a second image sensor and to perform image capturing in a rear direction;
an operation section configured to include at least one of a switch, button, or a touch panel and to receive an operation input by a user;
at least one processor; and
a memory coupled to the at least one processor, the memory having instructions that, when executed by the at least one processor, perform the operations as:
an image-capturing intention-determining section configured to determine, in a case where no operation on the operation section is performed after an image of an object has been captured by the first image capturing section, whether or not a user has intention of capturing an image, based on an image captured by the second image capturing section; and
a controller that is configured to set, in a case where it is determined that the user does not have the intention of capturing an image, the first image capturing section to a first operation state selected from states in which image capturing can be performed, including the first operation state and a second operation state larger in power consumption than the first operation state.

2. The image capturing apparatus according to claim 1, wherein in a case where a user's face is included in an image captured by the second image capturing section, the image-capturing intention-determining section determines that the user has the intention of capturing an image.

3. The image capturing apparatus according to claim 1, wherein in a case where it is determined that the user does not have the intention of capturing an image, the controller shifts the first image capturing section from the second operation state to the first operation state.

4. The image capturing apparatus according to claim 1, wherein after capturing an image of an object has been performed by the first image capturing section, in a case where a no-operation continuation time indicating time during which no operation on the operation section continues has reached a predetermined time period, the controller shifts the first image capturing section to the first operation state.

5. The image capturing apparatus according to claim 4, wherein after capturing an image of an object has been performed by the first image capturing section, in a case where an image-capturing intention determination continuation time indicating time during which determination processing by the image-capturing intention-determining section is performed has reached a predetermined time period, the controller further inhibits the determination processing.

6. The image capturing apparatus according to claim 5, wherein the predetermined time period of the image-capturing intention determination continuation time is set to be shorter than the predetermined time period of the no-operation continuation time.

7. The image capturing apparatus according to claim 1, wherein after capturing an image of an object has been performed by the first image capturing section, the controller sets the second image capturing section to the second operation state.

8. The image capturing apparatus according to claim 7, wherein after image capturing in the rear direction is performed by the second image capturing section, the controller sets the second image capturing section to a third operation state smaller in power consumption than the first operation state.

9. The image capturing apparatus according to claim 8, wherein the third operation state is a state in which image capturing cannot be performed.

10. The image capturing apparatus according to claim 1, wherein in the first operation state, at least one of a frequency of image capturing, a frequency of reading out an object image from an image sensor, and a pixel resolution of an image to be read out is made lower than in the second state.

11. A method of controlling an image capturing apparatus including a first image capturing section for capturing an image of an object, a second image capturing section for performing image capturing in a rear direction, and an operation section configured to receive an operation input by a user, comprising:

determining, in a case where no operation on the operation section is performed after an image of an object has been captured by the first image capturing section, whether or not a user has intention of capturing an image, based on an image captured by the second image capturing section; and setting, in a case where it is determined that the user does not have the intention of capturing an image, the first image capturing section to a first operation state selected from states in which image capturing can be performed, including the first operation state and a second operation state larger in power consumption than the first operation state.

12. A non-transitory computer-readable storage medium storing a program for causing a computer to execute a method of controlling an image capturing apparatus including a first image capturing section for capturing an image of an object, a second image capturing section for performing image capturing in a rear direction, and an operation section configured to receive an operation input by a user, wherein the method comprises:

determining, in a case where no operation on the operation section is performed after an image of an object has been captured by the first image capturing section, whether or not a user has intention of capturing an image, based on an image captured by the second image capturing section; and setting, in a case where it is determined that the user does not have the intention of capturing an image, the first image capturing section to a first operation state selected from states in which image capturing can be performed, including the first operation state and a second operation state larger in power consumption than the first operation state.

* * * * *